United States Patent [19]
Rollins

[11] Patent Number: 4,754,423
[45] Date of Patent: Jun. 28, 1988

[54] ELECTRONIC SELECTOR AND METHOD FOR SELECTING DESIRED FUNCTIONS AND LEVELS

[75] Inventor: Thomas J. Rollins, Boca Raton, Fla.

[73] Assignee: Motorola, Inc., Schaumburg, Ill.

[21] Appl. No.: 874,737

[22] Filed: Jun. 16, 1986

[51] Int. Cl.[4] ........................ G04C 3/00; G04C 21/32; G06F 3/02

[52] U.S. Cl. ........................ 364/900

[58] Field of Search ... 364/200 MS File, 900 MS File, 364/709; 368/224, 51, 245, 246, 69; 340/309.4, 712, 825.44; 381/101

[56] References Cited

U.S. PATENT DOCUMENTS

| | | | |
|---|---|---|---|
| 4,073,131 | 2/1978 | Takase et al. | 368/224 |
| 4,084,401 | 4/1978 | Belardi et al. | 58/4 |
| 4,090,350 | 5/1978 | Nomura | 368/224 |
| 4,094,135 | 6/1978 | Nomura et al. | 368/224 |
| 4,175,375 | 11/1979 | Takase | 58/23 |
| 4,193,120 | 3/1980 | Yello | 364/900 |
| 4,322,831 | 3/1982 | Peterson | 368/51 |
| 4,325,081 | 4/1982 | Abe et al. | 358/127 |
| 4,378,821 | 2/1983 | Morishige | 368/245 |
| 4,394,087 | 7/1983 | Irie et al. | 340/712 |
| 4,405,241 | 9/1983 | Aihara et al. | 368/246 |
| 4,471,352 | 9/1984 | Soulliard et al. | 364/900 |
| 4,482,978 | 11/1984 | Yuasa et al. | 364/900 |
| 4,485,381 | 11/1984 | Lewiner et al. | 340/825.31 |
| 4,490,711 | 12/1984 | Johnston | 340/309.4 |
| 4,561,049 | 12/1985 | Deleganes et al. | 364/130 |
| 4,589,779 | 5/1986 | Hatta et al. | 368/246 |
| 4,604,699 | 8/1986 | Borcherdt et al. | 364/200 |
| 4,646,081 | 2/1987 | Tsunoda | 340/825.44 |

FOREIGN PATENT DOCUMENTS

| | | | |
|---|---|---|---|
| 0019480 | 2/1981 | Japan | 368/249 |

*Primary Examiner*—Gareth D. Shaw
*Assistant Examiner*—Viet Q. Nguyen
*Attorney, Agent, or Firm*—Daniel K. Nichols; Joseph T. Downey; Anthony J. Sarli

[57] ABSTRACT

This is a selector circuit for an electronic device such as a pager that has a plurality of functions with each of the functions having a plurality of levels. First and second switches are provided for selecting the functions and levels. A controller such as a microprocessor is responsive to the first and second switches for selecting the functions and levels. The functions are selected by first actuating the first switch and then actuating the second switch while the first switch is maintained actuated. Levels of selected functions are selected by first actuating the second switch and then actuating the first switch while the second switch is maintained actuated.

15 Claims, 2 Drawing Sheets

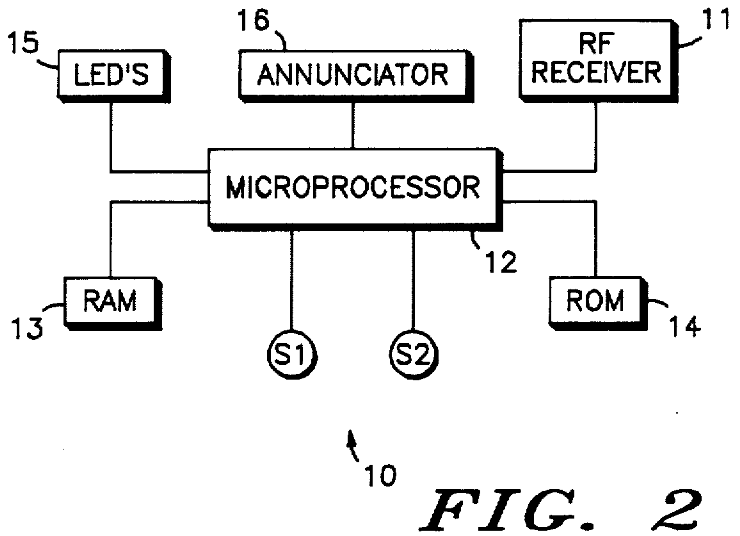
FIG. 2
FIG. 3
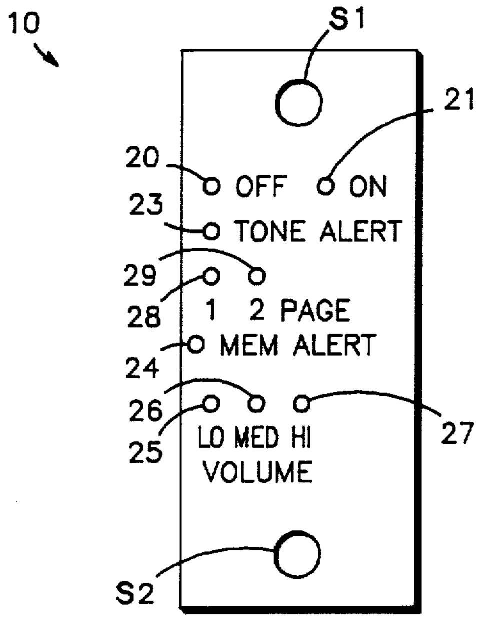

ELECTRONIC SELECTOR AND METHOD FOR SELECTING DESIRED FUNCTIONS AND LEVELS

BACKGROUND OF THE INVENTION

This invention relates to electronic selector circuits in general and particularly to a circuit for selecting a plurality of functions with each having a plurality of associated levels.

Various control circuits have been utilized on electronic devices such as digital clocks and watches, VCRs, radio paging receivers and the like for programming and/or selection of features or operating characteristics.

As an example, on digital alarm clocks, it is common to utilize four switches, a time switch, an alarm switch, an hour switch, and a minute switch. In programming such digital clocks, the time is set by holding the time switch depress and simultaneously depressing the hour switch until the correct hour is indicated. Then, while holding the time switch depressed, the minute switch is depressed until the correct minute setting is indicated. The alarm setting is programmed in a similar manner while depressing the alarm switch rather than the time switch.

An approach utilized in programming a VCR (video cassette recorder) after turning it on involves first depressing and releasing a programming switch and then depressing a selector switch to step through various functions.

Programming of each selected function is accomplished with a set switch after the selector switch is released. With this approach various functions such as, VCR ON time, VCR OFF time and channel can be selected.

In miniature electronic devices, such as radio pagers, it is often desirable to provide a number of user selectable functions or options with the functions having selectable level alternatives. In such devices, it is particularly important that the number of switches be minimized due to size constraints as well as and cost considerations. The programming steps should not be complex in order to provide ease of operation for the pager user.

SUMMARY OF THE INVENTION

This selector for an electronic device utilizes two switches in order to provide for the selection of a plurality of functions which each include a plurality of levels.

In one aspect of the invention, the electronic device includes a first switch and a second switch. Control means are responsive to the first and second switches for selecting functions and levels. The control means operatively selects functions when the first switch is actuated and the second switch is then actuated while the first switch is actuated. The control means operatively selects levels when the second switch is actuated and the first switch is then actuated while the second switch is actuated.

In another aspect of the invention, a display means is actuated by the control means for displaying the select function levels. In another aspect, the display means includes a plurality of LED's with an LED corresponding to each level of each function.

In still another aspect of the invention, the control means is a microprocessor. In yet another aspect of the invention, the functions include an ON/OFF function having an ON level and an OFF level.

In one aspect of the invention, the control means is responsive to the initial actuation of at least one of the switches to display the function levels that are currently selected. In another aspect of the invention, the control means actuates the display means to display the currently selected level of the currently selected function at a predetermined time period after the initial actuation of said at least one of the switches. In another aspect of the invention, the control means is responsive to the deactuation of the switches to discontinue the display.

In another aspect of the invention, the selector is utilized for a pager.

Another aspect of the invention comprises a method of selecting a particular level of a particular function of an electronic device. The method includes the steps of actuating a first switch, then actuating a second switch while the first switch is actuated to select a function, and then deactuating the first and second switches. Further steps includes actuating the second switch and actuating the first switch while second switch is actuated to select the level of the selected function, and then deactuating the first and second switches.

BRIEF DESCRIPTION OF THE DRAWINGS

FIG. 2 is a block diagram of a radio paging device utilizing the selector of the preferred embodiment.

FIG. 3 is a plan view of the radio paging device of the preferred embodiment showing the switch and indicator configuration.

DESCRIPTION OF THE PREFERRED EMBODIMENT

Figure 1:
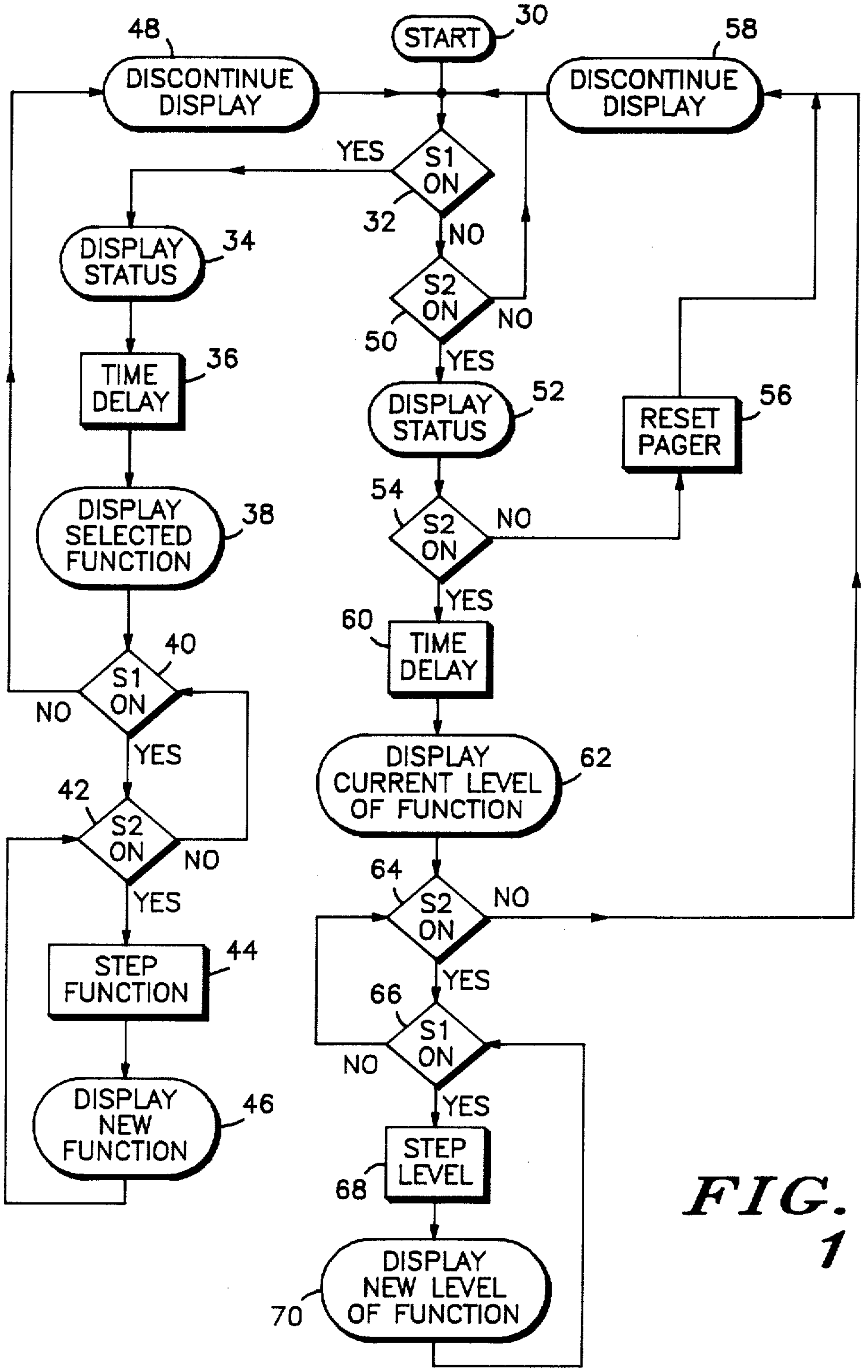
FIG. 1 is a detailed flow chart of the implementation of the selector of the preferred embodiment.

Referring now by characters of reference to the drawings and first to FIG. 2, it will be understood that a selective call radio paging receiver, or pager, indicated generally by 10 includes an RF receiver portion 11 that provides detected RF signals to a microprocessor 12 constituting control means. The microprocessor 12 is connected to a random access memory (RAM) 13 used for working purposes. A read only memory (ROM) 14 is connected to the microprocessor 12 and includes both the operating program for the microprocessor as well as functioning as a code plug for storing the representation of the address of the radio pager 10.

A plurality of indicator LED's 15 constituting display means are connected to the microprocessor by appropriate control lines and are controlled by the microprocessor for indicating various functions and levels of operation of the pager 10. The microprocessor 12 is also coupled to an annunciator 16 that is utilized for providing tone alert signals from the pager 10. A pair of user operable switches S1 and S2 are connected to and monitored by the microprocessor 12. These two switches, S1 and S2, are utilized for complete user control of the operation of the pager 10 including turning the pager ON and OFF.

Referring now to FIG. 3, the individual LED's 15 are shown in greater detail. The pager 10 includes an LED 20 to indicate OFF and and LED 21 to indicate ON. TONE ALERT is indicated by LED 23 while MEM ALERT is indicated by LED 24. In the preferred embodiment, the volume is indicated by LED's 25, 26 and 27 corresponding to LOW (LO), MEDIUM (MED) and HIGH (HI) volume settings respectively.

In MEM ALERT, two PAGE indicator LED's 30 and 31 are included to designate whether a type ONE (1) or type TWO (2) page has been received. With dual alert the pager responds to two different codes and produces different audio alerting tones to designate which code was received. In MEM ALERT, the pager does not produce an audio alert but indicates that a page has been received by flashing either LED 28 or LED 29 depending on which code was received.

FIG. 1 shows the operation of the microprocessor 12 in monitoring switches S1 and S2 and controlling the LED's 15. From the start block 30, the status of switches S1 and S2 are monitored. The start block 30 is connected to decision block 32 labelled S1 ON. The YES output of decision block 32 is connected to the display status block 34 to activate the appropriate LED's 15 to show the current status of the pager 10, that is the level of each function that is currently selected.

The output of block 34 is connected to a time delay block 36 which has its output connected to a display selected function block 38. The output of display selected function block 38 is connected to decision block 40 labelled S1 ON. The NO output of decision block 40 is coupled to a discontinue display block 48, which has its output coupled to the input of decision block 32. The YES output of decision block 40 is coupled to a decision block 42 labelled S2 ON. Decision block 42 has its NO output coupled back to decision block 40 while its YES output is coupled to step function block 44. Block 44 is coupled to display new function block 46 which has its output coupled back to decision block 42.

The NO output of decision block 32 is coupled to decision block 50 labelled S2 ON. The NO output of decision block 50 is coupled back to the input of decision block 32 while the YES output of decision block 50 is coupled to display status block 52. The output of block 52 is coupled to decision block 54 labelled S2 ON. The output of decision block 54 is coupled to reset pager block 56 which is coupled to a discontinue display block 58. The discontinue display block 58 has its output coupled to the input of decision block 32.

The YES output of decision block 54 is coupled to a time delay block 60 that has its output coupled to a display current level of function block 62. The output of block 62 is coupled to decision block 64 labelled S2 ON. The NO output of decision block 64 is coupled to the input of the discontinue display block 58 while its YES output is coupled to a decision block 66 labelled S1 ON. The NO output of decision block 66 is coupled back to the decision block 64 while its YES output is coupled to a step level block 68. The output of block 68 is coupled to a display new level of function block 70 that has its output coupled back to decision block 66.

While it is believed that the operation and advantages of the selector circuit have become fully apparent from the foregoing description, a brief description of the operation of the selector in conjunction with the pager 10 will be discussed.

The pager 10 includes three functions, the first function being the ON/OFF function with two possible levels, one being the OFF level indicated by LED 20 and the other being the ON level indicated by LED 21. The second function is the alert function that includes two levels, one being TONE ALERT indicated by LED 23 and the other being MEM ALERT indicated by LED 24. The third function is the volume function and it has three possible levels, LO, MED and HI which are indicated by LED's 25–27 respectively. It should be noted that the PAGE LED's 28 and 29 are actual alert lights for designating the type of page received when in the MEM ALERT level of operation.

Assuming first that the pager is off and S2 is initially depressed, LED 20 will light indicating that the pager is off. If S2 is now maintained actuated for a time period, which in the preferred embodiment is 1 second, the display then shows the current level of the function which in this case is only the OFF LED 20 being on.

With S2 still depressed, if S1 is now depressed the level is stepped causing the pager to go from off to on and the new level is indicated as ON LED 21 is lighted. If the switches S1 and S2 are then released, the display is discontinued; that is, LED 21 is turned OFF and the pager would now be on and functioning. If, however, S1 is pressed a second time, while S2 remains depressed, the next level of the function would be reached, which would be the OFF level designated by LED 20. At this point, both switches S1 and S2 could be released, the display pager would discontinue and the pager would be off.

Assuming now that the pager is on when switch S1 is depressed the current status of the pager 10 is displayed. This will include lighting the LED 21 to indicate that the pager is on and lighting either LED 23 or 24 of the alert function and LED 25, 26 or 27 of the volume function. If the pager 10 has just been turned ON, the designated level for each function will be predetermined from the memory of the pager. For example, the alert function could default to TONE ALERT designated by LED 23 while the volume function could default to MED designated by LED 26. Had other levels been previously chosen for the functions, the display would have displayed the preselected levels. After a time delay, the display LED's 15 will display only the current function. As the pager has just been turned on, the default function corresponds to the last selected function which is the OFF/ON function.

At this point, only ON LED 21 would be lighted. The user can then step to the next function by depressing switch S2 while maintaining switch S1 depressed. This would cause only the alert function to light. In the default case, the TONE ALERT LED 23 would light. If the user wished to switch from TONE ALERT to MEM ALERT, both switches S1 and S2 would be released and level shifting of this function would be accomplished in a manner that will be discussed below.

Assuming that the user wishes to reset the volume function, switch S2 would be released and depressed a second time (or held on for a predetermined time period) while maintaining S1 depressed. This causes only the volume function LED's to be on and in the default situation the MED LED 26 would be lighted. Having now selected the volume function, switches S1 and S2 are both released.

The user can then reprogram the level of the selected function. This is accomplished by now first depressing switch S2 which will initially cause the pager to display the current status, which would be indicated by ON LED 21, TONE ALERT LED 23 and MED LED 26, and after a time delay the display would show only the current level of the selected function, which would be the volume function and only MED LED 26 would be on. At this point the user, by depressing switch S1, causes the volume function to switch to its next sequential volume level and the HI LED 27 would now light. If switch S1 is depressed and released again, the volume function would step to the next level of low and only LO LED 25 would light. A further depression of switch S1 would cause the volume level to go back to MED. Consequently, switch S1 is depressed the appropriate number of times to chose the desired volume level, such as HI. Then, both switch S1 and S2 are released causing the display to be discontinued.

Should the user desire to reset another function, such as the alert function, switch S1 would again be depressed and switch S2 would be used to step to the alert function at which time the switches S1 and S2 would be released. Then switch S2 would be depressed and the appropriate level of the alert function would be chosen by actuating switch S1. In this manner, each possible level of each of the functions can be selected.

When stepping from function to function, it is not necessary to deactuate switch S2. If S2 is maintained actuated the selected function will continue to be stepped. Likewise when stepping from level to level, switch S1 can be maintained actuated and the selected levels will be stepped.

If the user desires only to display the current status, switch S1 can be depressed causing the status to be displayed and then switch S1 can be released. If a pager reset is required, switch S2 is depressed which will also cause the current status to be displayed and upon the release or deactuation of switch S2 without the actuation of switch S1, the pager will reset. Consequently, full control including ON/OFF, alert selection, volume selection, and pager reset are accomplished solely with the use of two switches, S1 and S2.

I claim as my invention:

1. A selector for an electronic device having a plurality of functions with each function having a plurality of levels, including an ON/OFF function having an ON level corresponding to the electronic device being on and an OFF level corresponding to the electronic device being off comprising:

a first switch, a second switch, and control means responsive to actuation of said first and second switches for selecting said functions and said levels, wherein said control means operatively selects functions when said first switch is actuated first and maintained actuated and said second switch is then actuated, and said control means operatively selects levels when said second switch is actuated first and maintained actuated and said first switch is then actuated.

2. The selector for an electronic device as defined in claim 1, further comprising:

a display means actuated by the control means for displaying selected function levels.

3. The selector for an electronic device as defined in claim 2, wherein:

said control means comprises a microprocessor.

4. The selector for an electronic device as defined in claim 2, wherein:

said display means includes a plurality of LED's with one of said LED's corresponding to each level of each function.

5. The selector for an electronic device as defined in claim 2, wherein:

the control means is responsive to the initial actuation of at least one of said switches to display function levels that are currently selected.

6. The selector for an electronic device as defined in claim 5, wherein:

the control means actuates said display means to display the currently selected level of the currently selected function at a predetermined time period after said initial actuation of said at least one of said switches.

7. The selector for an electronic device as defined in claim 5, wherein the control means is responsive to the deactuation of said switches to discontinue said display.

8. A selector for a pager having a plurality of functions including an ON/OFF function with each function having a plurality of levels, comprising:

a first switch, a second switch, and control means responsive to actuation of said first and second switches for selecting said functions and said levels, wherein said control means operatively selects functions when said first switch is actuated first and maintained actuated and said second switch is then actuated, and said control means operatively selects levels when said second switch is actuated first and maintained actuated and said first switch is then actuated for controlling said pager.

9. The selector for a pager as defined in claim 8, further comprising:

a display means actuated by the control means for displaying selected function levels of said pager.

10. The selector for a pager as defined in claim 9, wherein:

said control means comprises a microprocessor.

11. The selector for a pager as defined in claim 10, wherein:

said display means includes a plurality of LED's with one of said LED's corresponding to each level of each function of said pager.

12. The selector for a pager as defined in claim 11, wherein:

the control means is responsive to the initial actuation of at least one of said switches to display function levels of the pager that are currently selected.

13. The selector for a pager as defined in claim 12 wherein:

the control means is responsive to the deactuation of said switches to discontinue said display.

14. The selector for a pager as defined in claim 12, wherein:

the control means actuates said display means to display the currently selected level of the currently selected function of said pager at a predetermined time period after said initial actuation of said at least one of said switches.

15. The selector for a pager as defined in claim 14, wherein:

the control means is responsive to the deactuation of said switches to discontinue said display.

* * * * *